(12) United States Patent
Weltzin et al.

(10) Patent No.: US 11,147,018 B2
(45) Date of Patent: Oct. 12, 2021

(54) SYSTEM AND METHOD FOR LOW POWER Z-WAVE BEAMING DETECTION

(71) Applicant: Silicon Laboratories Inc., Austin, TX (US)

(72) Inventors: Casey Ryan Weltzin, Cedar Park, TX (US); Charles Anthony Weinberger, Austin, TX (US); Jake Gordon Wood, Boston, MA (US); Guner Arslan, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 7 days.

(21) Appl. No.: 16/654,342

(22) Filed: Oct. 16, 2019

(65) Prior Publication Data
US 2021/0120492 A1    Apr. 22, 2021

(51) Int. Cl.
| | |
|---|---|
| *H04W 52/02* | (2009.01) |
| *H04W 24/10* | (2009.01) |
| *H04B 7/08* | (2006.01) |
| *H04W 4/80* | (2018.01) |
| *G07C 9/00* | (2020.01) |

(52) U.S. Cl.
CPC .......... *H04W 52/0229* (2013.01); *H04B 7/08* (2013.01); *H04W 4/80* (2018.02); *H04W 24/10* (2013.01); *H04W 52/0245* (2013.01); *G07C 9/00309* (2013.01)

(58) Field of Classification Search
CPC ......... H04W 52/0229; H04W 52/0245; H04W 4/80; H04W 24/10; H04B 7/08; G07C 9/00309

USPC .......................................................... 370/311
See application file for complete search history.

(56) References Cited

U.S. PATENT DOCUMENTS

| | | | |
|---|---|---|---|
| 2008/0151826 A1 | 6/2008 | Shorty et al. | |
| 2016/0277177 A1 | 9/2016 | de Ruijter et al. | |
| 2018/0159706 A1* | 6/2018 | Xiong | H04B 1/0039 |
| 2018/0212792 A1* | 7/2018 | Brandt | H04L 67/12 |
| 2018/0287832 A1 | 10/2018 | Zhou et al. | |

FOREIGN PATENT DOCUMENTS

WO    WO-2018148616 A1 *  8/2018 ............... H04B 1/24

* cited by examiner

*Primary Examiner* — Yemane Mesfin
*Assistant Examiner* — Intekhaab A Siddiquee
(74) *Attorney, Agent, or Firm* — Nields, Lemack & Frame, LLC

(57) ABSTRACT

A system and method for detecting and receiving Z-Wave Beams that are transmitted over a plurality of channels is disclosed. The system includes a radio circuit, which includes a Digital Signal Arrival (DSA) circuit and a read channel. The DSA circuit is able to detect the presence of a valid signal on a particular channel, based on received signal power, detected frequency deviation, the magnitude of phase spikes and/or other characteristics. The read channel is able to decode incoming packets. Software is used to control the DSA circuit and the read channel so that, during each wake up period, the FLiRS device monitors all available channels to determine if a Z-Wave Beam is present. If a Z-Wave Beam is detected, the read channel receives the Z-Wave Beam. Otherwise, the FLiRS device returns to sleep mode.

17 Claims, 5 Drawing Sheets

SYSTEM AND METHOD FOR LOW POWER Z-WAVE BEAMING DETECTION

FIELD

This disclosure describes systems and methods for detecting Z-Wave Beaming, and more particularly detecting Z-Wave Beams while minimizing power consumption.

BACKGROUND

In most wireless networks, data is communicated between devices using packets of information. In certain embodiments, packets are transmitted from a source to a destination over a network that uses one or more channels Each channel may represent a particular frequency or data rate. For example, certain protocols utilize a frequency hopping algorithm to switch between two or more channels.

Certain network protocols have been adapted to allow the use of low power devices, which may be in a low power mode for a substantial amount of time. For example, some network protocols allow a powered node to save commands designated for a low power device, such that that low power device queries the powered node upon waking.

The Z-Wave network protocol utilizes a different mechanism to accommodate low power devices. Specifically, the Z-Wave protocol utilizes a concept referred to a Frequently Listening Receiver Slave (FLiRS). Low power devices that implement FLiRS, also referred to as FLiRS devices, alternate between a sleep mode and a partially awake mode in which the FLiRS device is listening for a beam signal. In some embodiments, the rate at which the FLiRs device enters this partially awake mode may be about once per second or less.

Because FLiRS devices are awake very infrequently, Z-Wave also implements a mechanism referred to as Z-Wave Beaming. A device that implements Z-Wave Beaming will continuously transmit the Z-Wave Beam to a FLiRS device until that FLiRS device acknowledges receipt of the Z-Wave Beam. The Z-Wave Beam may comprise a packet that is repeated a plurality of times. As an example, a door lock may be a FLiRS device. When the door lock is to be opened, the user may activate a software application on their mobile device. This application may continuously transmit a Z-Wave Beam to the door lock until the door lock responds and unlocks the door.

In many applications, the FLiRS device has an internal battery as its only power source. Consequently, it is important to minimize the power consumption at all times. Thus, it is typically a goal to ensure that the wake up interval used to detect Z-Wave Beams is kept as short as possible.

However, this may be challenging. For example, most devices require a minimum amount of time to determine whether a Z-Wave Beam is being transmitted. Therefore, even if there are no Z-Wave Beams being transmitted, a FLiRS device may waste precious battery power trying to detect a Z-Wave Beam. Secondly, in some embodiments, the Z-Wave protocol utilizes multiple channels. A channel is defined as a specific combination of frequency, bit rate, modulation scheme and encoding scheme. For FLiRS devices that are operating on a multi-channel Z-Wave network, the FLiRS device must be able to monitor the network at each of these channels before determining that it can re-enter sleep mode.

This may be accomplished using redundant hardware. For example, a semiconductor receiver may incorporate a plurality of detection circuits, where each detection circuit is configured to monitor a single channel. Each of these detection circuits is in communication with a radio circuit, which is capable of receiving and decoding an incoming packet, based on configuration parameters. In this embodiment, once one of the detection circuits detects the presence of a packet, the configuration parameters of the radio circuit are switched to that channel so that the packet may be received.

However, while very effective at detecting packets on multiple channels simultaneously, this approach is expensive in terms of hardware and power consumption. Further, the amount of hardware needed with this approach scales with the number of channels. For example, if the protocol utilizes two channels, there must be two detection circuits. However, if there are four channels, there must be four detection circuits. Thus, the complexity of this approach increases linearly with the number of channels. Furthermore, the power consumption of this approach also scales linearly with the number of channels.

Therefore, it would be beneficial if there were a system and method that could detect and receive Z-Wave Beams on a plurality of channels, but did not require additional hardware circuitry to perform this detection. Further, it would be advantageous if this system minimized power consumption.

SUMMARY

A system and method for detecting and receiving Z-Wave Beams that are transmitted over a plurality of channels is disclosed. The system includes a radio circuit, which includes a Digital Signal Arrival (DSA) circuit and a read channel. The DSA circuit is able to detect the presence of a valid signal on a particular channel, based on received signal power, detected frequency deviation, the magnitude of phase spikes and/or other characteristics. The read channel is able to decode incoming packets. Software is used to control the DSA circuit and the read channel so that, during each wake up period, the FLiRS device monitors all available channels to determine if a Z-Wave Beam is present. If a Z-Wave Beam is detected, the read channel receives the Z-Wave Beam. Otherwise, the FLiRS device returns to sleep mode.

According to one embodiment, network device for receiving a packet on a network that utilizes a plurality of channels is disclosed. The network device comprises a network interface, comprising a radio circuit to receive wireless signals on a selected channel and convert the wireless signals into digital signals; a digital signal arrival (DSA) circuit to receive the digital signals and determine whether a valid signal is present on the selected channel; a read channel to receive the digital signals and decode the digital signals to form packets; a processing unit, in communication with the network interface; and a memory device, in communication with the processing unit, the memory device comprising instructions that, when executed by the processing unit, enable the network device to load a set of values into hardware registers disposed in the radio circuit, wherein the set allows the radio circuit to monitor one channel of the network; monitor the channel for a valid signal using the DSA circuit; if the valid signal is detected within a predetermined period of time, process a packet on the channel; and if the valid signal is not detected within the predetermined period of time, load a different set of values into the hardware registers and repeating until all channels have been monitored. In certain embodiments, the predetermined period of time is user selectable. In some embodiments, the predetermined period of time is greater than a minimum time needed by the DSA circuit to detect the valid signal. In some embodiments, the valid signal is detected by monitoring the digital signals for the presence of an FSK signal. In certain embodiments, the valid signal is detected by monitoring the phase or frequency of the digital signals. In certain embodiments, processing the packet on the channel comprises loading values into registers disposed in the read channel; determining whether the packet was received within a second predetermined duration of time; if the packet was not received, entering sleep mode; and if the packet was received, determining if the packet was intended for this device. In some embodiments, the network utilizes a Z-Wave network protocol. In certain further embodiments, the packet comprises a Z-Wave Beam.

According to another embodiment, a method of detecting the presence of a packet on a wireless network utilizing multiple channels is disclosed. The method comprises loading a set of values into hardware registers disposed in a radio circuit, wherein the set allows the radio circuit to monitor one channel of the wireless network; monitoring the channel for a valid signal; if the valid signal is detected within a predetermined period of time, receiving the packet on the channel; and if the valid signal is not detected within the predetermined period of time, loading a different set of values into the hardware registers and repeating until all channels have been monitored. In certain embodiments, the valid signal is detected by converting the wireless signal into one or more digital signals and monitoring the digital signals for the presence of an FSK signal. In some embodiments, valid signal is detected by converting the wireless signal into one or more digital signals and monitoring the phase of the digital signals. In certain embodiments, the valid signal is detected by converting the wireless signal into one or more digital signals and monitoring the frequency of the digital signals. In some embodiments, the wireless network comprises a network that utilizes a Z-Wave network protocol. In certain embodiments, the packet comprises a Z-Wave Beam.

According to another embodiment, a software program, disposed on a computer readable non-transitory medium, for use with a network device operating on a wireless network, where the network device comprising a processing unit, a radio circuit to receive wireless signals on a selected channel and convert the wireless signals into digital signals and a digital signal arrival (DSA) circuit to receive the digital signals and determine whether a valid signal is present on the selected channel, is disclosed. The software program comprises instructions, which when executed by the processing unit, enable the processing unit to load a set of values into hardware registers disposed in the radio circuit, wherein the set allows the radio circuit to monitor one channel of the network; monitor the channel for a valid signal using the DSA circuit; if the valid signal is detected within a predetermined period of time, process a packet on the channel; and if the valid signal is not detected within the predetermined period of time, load a different set of values into the hardware registers and repeat until all channels have been monitored. In certain embodiments, the valid signal is detected by monitoring the digital signals for the presence of an FSK signal. In some embodiments, the valid signal is detected by monitoring the phase or frequency of the digital signals. In certain embodiments, the network utilizes a Z-Wave network protocol and the packet comprises a Z-Wave Beam.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
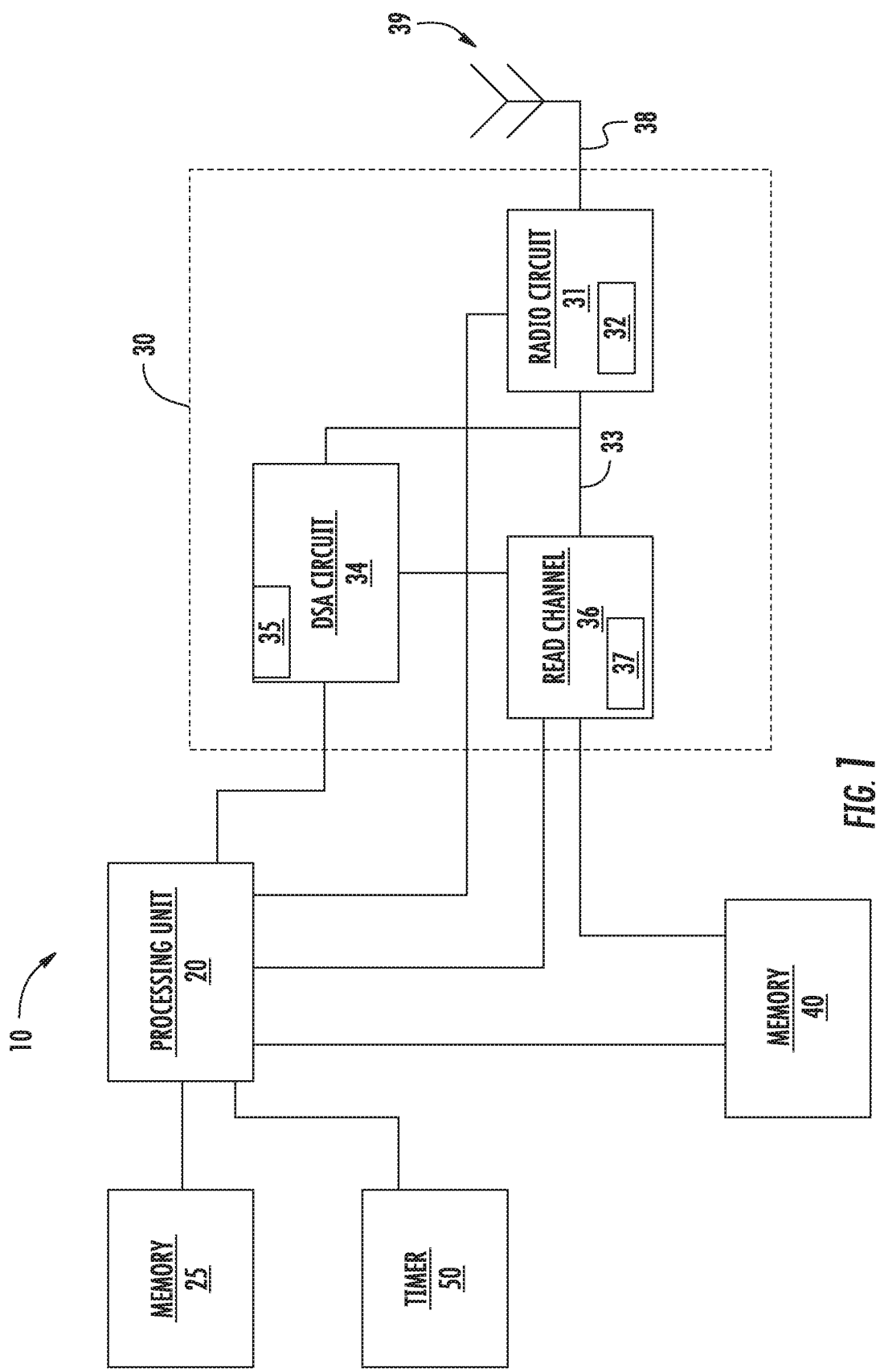
FIG. 1 is a block diagram of a representative FLiRS device.

FIG. 1 shows a block diagram of a representative network device 10. This network device 10 may be a FLiRS device.

As shown in FIG. 1, the network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna 38. The network interface 30 may support any wireless smart home protocols that support multiple channels and optionally beaming, such as Z-Wave. The network interface 30 is used to allow the network device 10 to communicate with other devices disposed on the network 39.

The network interface 30 includes radio circuit 31. This radio circuit 31 is used to process the incoming signal and convert the wireless signals to digital signals. The wireless signals first enter the network interface 30 through antenna 38. The antenna 38 is in electrical communication with a low noise amplifier (LNA). The LNA receives a very weak signal from the antenna 38 and amplifies that signal while maintaining the signal-to-noise ratio (SNR) of the incoming signal. The amplified signal is then passed to a mixer. The mixer is also in communication with a local oscillator, which provides two phases to the mixer. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_n$. The inphase signal, $I_n$, and the quadrature signal, $Q_m$, from the mixer are then fed into programmable gain amplifier (PGA). The PGA amplifies the $I_m$ and $Q_m$ signals by a programmable amount. These amplified signals are referred to as $I_g$ and $Q_g$. The amplified signals, $I_g$ and $Q_g$, are then fed from the PGA into an analog to digital converter (ADC). The ADC converts these analog signals to digital signals, $I_d$ and $Q_d$. These digital signals 33 then exit the radio circuit 31 and are used by other components of the network interface 30.

The radio circuit 31 also comprises a plurality of hardware registers 32, which are programmed by the processing unit 20. These hardware registers are used to set different parameters, such as carrier frequency, intermediate frequency (IF), analog filter bandwidth, gain settings, channel bandwidth and others. The output of the radio circuit 31 is one or more digital signals 33.

The network interface 30 also comprises a Digital Signal Arrival (DSA) circuit 34. The DSA circuit is used to detect energy on a particular channel of the network 39, based on the activity of the one or more digital signals 33. For example, the DSA circuit 34 monitors one or more digital signals 33 to determine if a valid frequency shift keying (FSK) signal is present. For example, FSK modulates the carrier frequency (Fc) by a deviation frequency (Fd), resulting in signals with frequencies between Fc−Fd and Fc+Fd. If the incoming signal has points with frequencies above Fc+Fd or below Fc−Fd by a predetermined amount, this may be indicative of an invalid signal. The frequency of the one or more digital signals 33 may be determined by differentiating the phase of the incoming digital signals. For example, the one or more digital signals may comprise quadrature signals, $I_d$ and $Q_d$. These incoming signals may be oversampled. This implies that multiple samples are taken for each possible bit of data. For example, if the maximum data rate is 2 Mbps, an sample rate of 8 MHz (four times oversampling) or 10 MHz (5 times oversampling) may be used. The $I_d$ and $Q_d$ signals then enter a CORDIC (Coordinate Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the DSA circuit 34, or elsewhere within the network interface 30.

By determining the phase difference between two adjacent points, frequency can be obtained. In other words, the frequency of point N is given by (Phase(N)−Phase(N−1))/oversample time, where oversample time is the reciprocal of oversample rate. This technique may be used to determine frequency deviation.

Additionally, the DSA circuit 34 may also analyze the phase of the one or more digital signals 33. Abrupt changes in phase may also be indicative of an invalid signal.

Additionally, each channel may have a minimum data bit duration. A bit is represented by a string of consecutive data points having the same or substantially the same frequency. Rapid changes in frequency, especially from positive frequencies to negative frequencies or vice versa, may be indicative of noise. In other words, the DSA circuit 34 may also look at the one or more digital signals 33 to determine whether the bit rate is within an expected range.

The DSA circuit 34 may also monitor other characteristics of the one or more digital signals 33. For example, the DSA circuit 34 may monitor the Received Signal Strength Indicator (RSSI) to help determine whether a valid signal is present on the channel.

Using one or more of these techniques, the DSA circuit 34 produces one or more outputs that report its status. Its status may provide an indication of whether the DSA circuit 34 has determined that a valid signal is present on the monitored channel. One of these outputs may be used by the read channel 36, as described below. Additionally, the DSA circuit 34 may have one or more hardware registers 35 which may be read and written by the processing unit 20. Some of these registers 35 are used to set the parameters of the DSA circuit 34. These parameters may include minimum and maximum frequency deviation, phase spike threshold, amplitude threshold, DSA window size and others. Other hardware registers 35 are used to report the status of the DSA circuit 34. For example, one of the hardware registers 35 may have one or more bits that signify that a valid signal was detected by the DSA circuit 34. In certain embodiments, the DSA circuit 34 may be capable of generating an interrupt to the processing unit 20 when a valid signal is detected.

The network interface 30 also includes a read channel 36. The read channel 36 is used to receive, synchronize and decode the incoming one or more digital signals 33. Specifically, the read channel 36 has a preamble detector that is used to identify the start of an incoming packet. The read channel 36 also has a sync detector, which is used to identify a particular sequence of bits that are referred to as a sync character. Additionally, the read channel 36 has a decoder which is used to convert the incoming one or more digital signals 33 into properly aligned bytes of data.

In certain configurations, the read channel 36 also uses the output of the DSA circuit 34 to further qualify the incoming data. In other words, the DSA circuit 34 provides another input to the read channel 36 which helps the read channel 36 to determine that a valid packet is being transmitted. In this embodiment, the read channel requires that a preamble be detected and that the DSA circuit 34 indicated that there was a valid signal on the selected channel.

In order to perform these functions, the read channel 36 may have one or more hardware registers 37 which may be read and written by the processing unit 20. The processing unit 20 may input various parameters such as baud rate, expected preamble sequence, expected sync word sequence, packet length and encoding scheme into the hardware registers 37. In certain embodiments, one of these hardware registers 37 may contain a bit that determines whether the output of the DSA circuit 34 is used by the read channel 36 to qualify the incoming signals.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as, for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 may also include one or more timers 50. These timers 50 may be configured by the processing unit 20 and may provide an indication to the processing unit 20 when expired. This indication may be in the form of an interrupt. In other embodiments, the processing unit 20 may poll the timers 50 to determine when the timers 50 have expired.

While the processing unit 20, the memory device 25, the network interface 30, the timer 50 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

The protocol associated with network 39 implements a channel hopping scheme, where packets may be transmitted or received on any of a defined number of channels. A channel is defined as a specific combination of frequency, bit rate, modulation scheme and encoding scheme. In certain embodiments, all channels may utilize the same modulation scheme and encoding scheme. In this embodiment, a channel is defined as a specific combination of frequency and bit rate. More generally, a channel is defined as any combination of one or more parameters that affects the bottom two layers of the OSI network, namely the physical and datalink layers.

Because the network utilizes multiple channels, the network interface 30 must be able to receive packets that are transmitted on any of these channels. This includes the ability to receive Z-Wave Beams on multiple channels. Thus, the network device 10 must be able to wake from sleep mode, monitor each channel for a Z-Wave Beam before returning to sleep mode. To maximize battery life, this process should be executed as quickly as possible. However, for acceptable performance, this process should be accurate in its determination that a Z-Wave Beam is or is not present.

According to the Z-Wave protocol, a Z-Wave Beam is sent repeatedly until an acknowledgement is received from the FLiRS device. Thus, it is possible that the Z-Wave Beam may be being transmitted while the network device 10 is in sleep mode. Similarly, it is also possible that no Z-Wave Beam is being transmitted when the network device 10 is awake.

In the present system, the network interface 30 comprises a radio circuit 31 that is configured to receive packets on only a single channel at a time. In other words, the radio circuit 31 does not include redundant hardware to allow it to monitor multiple channels simultaneously. Consequently, the present system utilizes time division multiplexing to operate on these multiple channels.

In other words, the radio circuit 31 is configured to receive transmissions on a specific channel for a certain duration of time. After this duration, the radio circuit 31 is then reconfigured to receive transmissions on a different channel. The radio circuit 31 cycles through all of the channels. In other words, at any given point in time, the network interface 30 is only capable of receiving packets that are being transmitted on one specific channel.

In order for the radio circuit 31 to operate in the network 39 that utilizes channel hopping, there is a unique set of values for the hardware registers for each channel. These hardware registers may include the hardware registers 32 in the radio circuit 31, the hardware registers 35 in the DSA circuit 34 and the hardware registers 37 in the read channel 36. In other words, if the network 39 utilizes three channels, there may be three unique sets of parameters for the hardware registers 32, 35 and 37.

The DSA circuit 34 is optimized to detect valid packet activity on a specific channel in a short period of time. For example, in certain embodiments, the DSA circuit 34 may be able to detect a valid FSK signal in less than 10 symbols. This rapid detection ability allows the DSA circuit 34 to be very useful during the Z-Wave Beam detection process. Note that the DSA circuit 34 is separate from the read channel 36 and is not capable of receiving packets. Rather, its hardware is specialized to perform a single function: the detection of a valid signal on a wireless network. The DSA circuit 34 cannot decode this signal. Decoding the signal is the function of the read channel 36.

Figure 2:
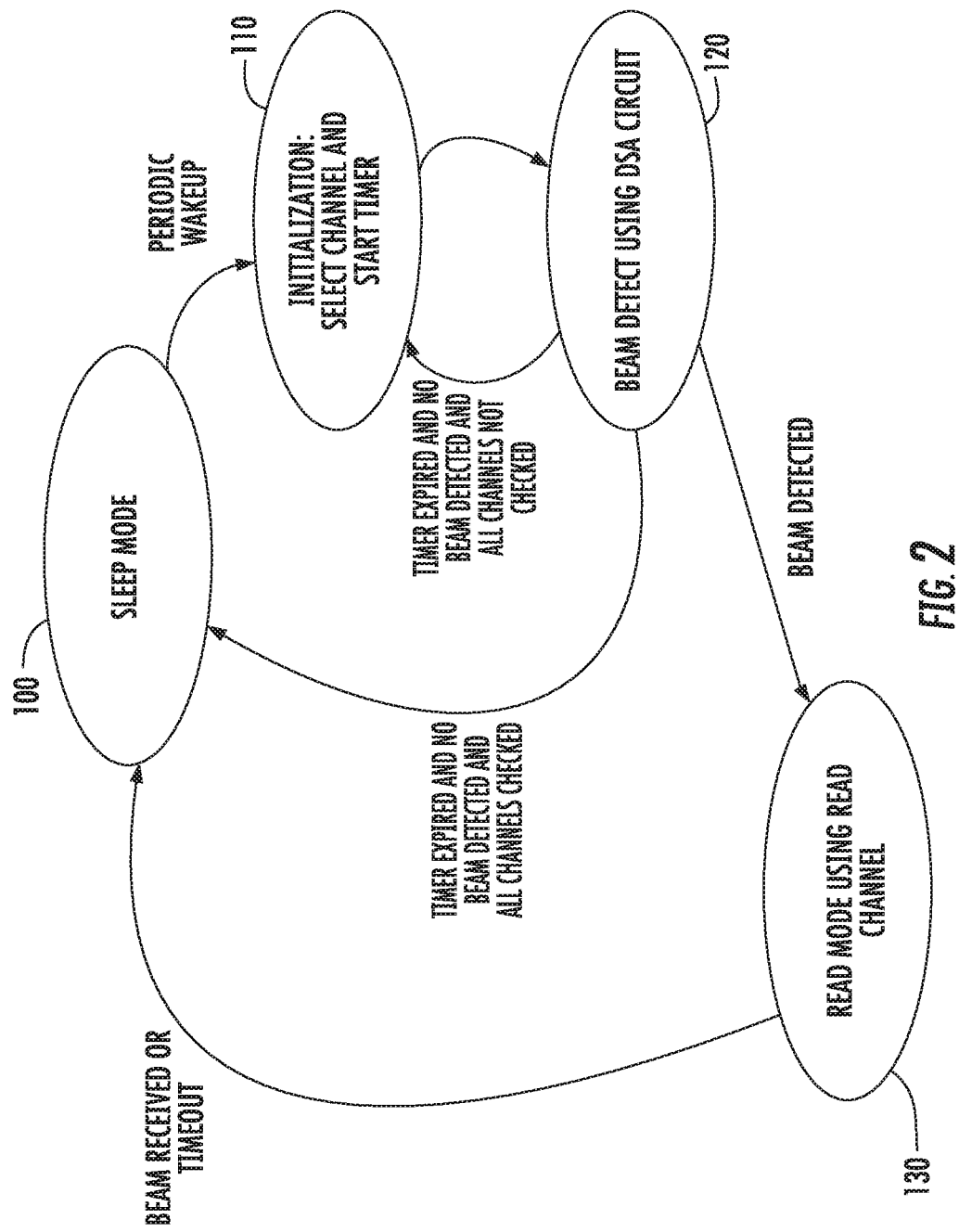
FIG. 2 is a representative flowchart showing the operation of the device according to one embodiment.

FIG. 2 shows a flowchart illustrating how the network device 10 operates with respect to Z-Wave Beam detection and reception. Typically, network device 10 is in a sleep mode 100. This sleep mode 100 consumes very low power. After a wake-up timer expires, the network device 10 awakens. Upon wakeup, the network device 10 enters a Z-Wave initialization state 110. In this state, the processing unit 20 loads a set of values into the hardware registers 32 of the radio circuit 31 and optionally a set of values into the hardware registers 35 in the DSA circuit 34.

The processing unit 20 may then start a timer 50. This timer 50 is the amount of time that the network device 10 will remain in Z-Wave Beam detection mode 120 on this channel before hopping to the next channel. Of course, if a valid signal is detected, the network device 10 will not hop to another channel. The value of the timer 50 may be user specified. In certain embodiments, the value of the timer 50 is related to the number of symbols required by the DSA circuit 34 to detect a valid signal. For example, the value of the timer 50 may be greater than or equal to the minimum time required for the DSA circuit 34 to detect a valid signal.

Once the hardware registers 32 and 35 have been loaded, the network device 10 enters Z-Wave Beam detection mode 120 for the selected channel. The network device 10 remains in this Z-Wave Beam Detection mode 120 until one or both of the following conditions occur:

the timer expires; and/or
a Z-Wave Beam is detected.

The transition from Z-Wave Beam detection mode 120 may be achieved in a variety of ways. In one embodiment, the network device 10 remains in the Z-Wave Beam detection mode 120 until the timer 50 expires. At that time, the processing unit 20 polls the hardware registers 35 within the DSA circuit 34. If the processing unit 20 determines that the DSA circuit 34 has detected a valid signal, the network device 10 transitions to Read Mode 130. If the processing unit 20 determines that the DSA circuit 34 has not detected a valid signal, the network device 10 returns to sleep mode 100. In another embodiment, while in Z-Wave Beam detection mode 120, the processing unit 20 continuously polls the hardware registers 35 within the DSA circuit 34. If a valid signal is detected prior to the expiration of the timer 50, the network device 10 transitions to the Read mode 130. Otherwise, once the timer 50 expires, the network device 10 returns to sleep mode 100. In yet another embodiment, the DSA circuit 34 is capable of generating an interrupt upon detection of a valid signal. In this embodiment, the processing unit 20 remains in the Z-Wave Beam detection mode 120 until either an interrupt is received or the timer 50 expires.

As mentioned above, if a valid signal is detected, the network device 10 transitions to the Read mode 130. In this mode, the processing unit 20 then programs the hardware register 37 in the read channel 36 to receive the Z-Wave Beam. In certain embodiments, the read channel 36 of the network device 10 automatically starts receiving the packet. The network device 10 remains in the Read mode 130 until the packet is received, or a timeout occurs. At this point, the network device returns to sleep mode 100.

If, however, the DSA circuit 34 did not detect a valid signal by the time the timer 50 expired, and all of the channels have not been monitored yet, the processing unit 20 returns to the Z-Wave initialization state 110, where it loads a new set of values into the hardware registers 32 and optionally hardware registers 35 to select a different channel. The processing unit 20 then restarts the timer 50. The sequence explained above then repeats.

If DSA circuit 34 did not detect a valid signal by the time the timer 50 expired, and all of the channels have been monitored, the processing unit 20 returns to sleep mode 100.

Figure 3:
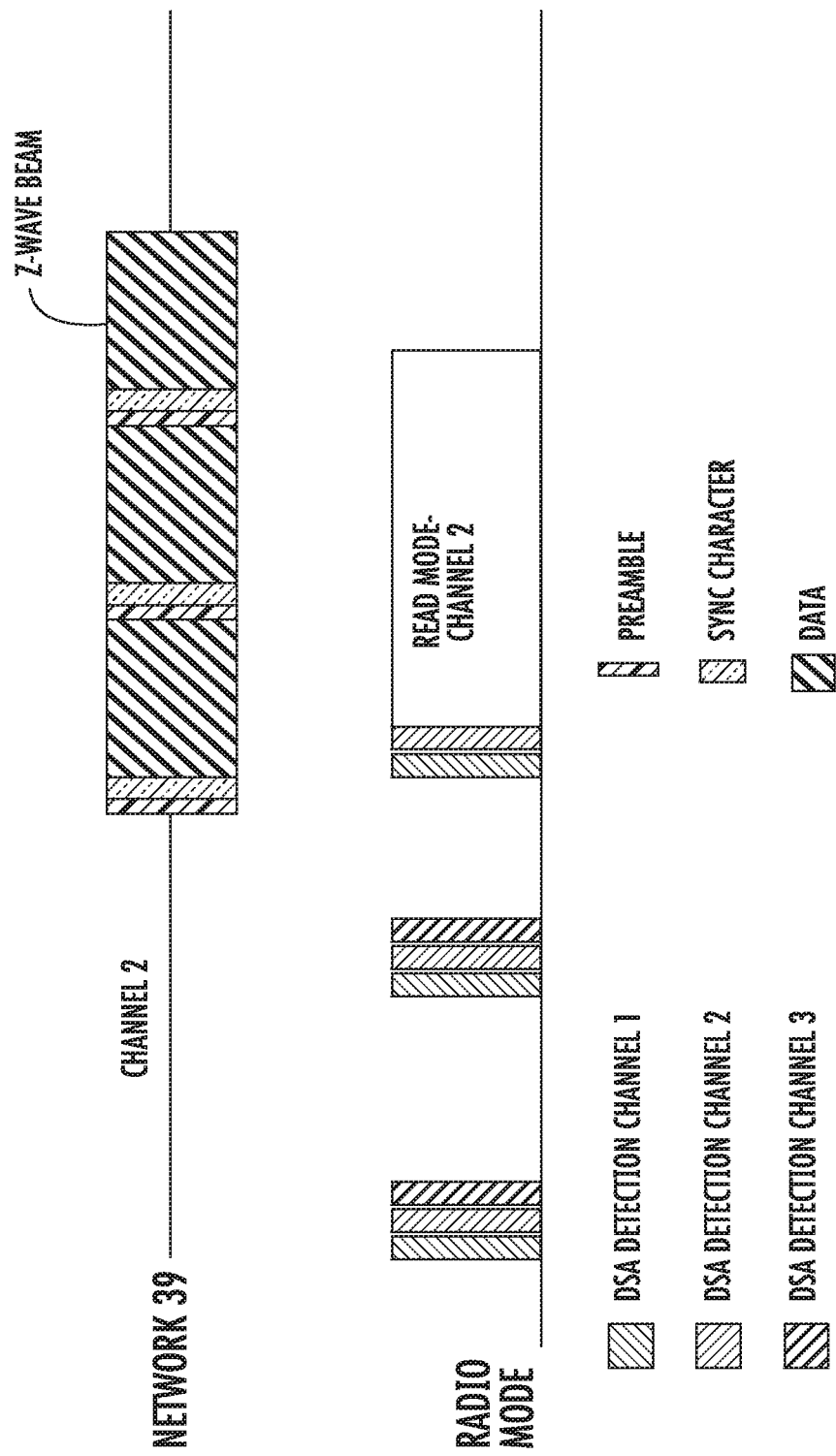
FIG. 3 is a timing diagram showing the operation of the device.

The operation of the network device 10 is shown in the timing diagram of FIG. 3. The timing is not drawn to scale. Rather, the time spent monitoring each channel is extended to improve understanding. It is noted that periods where the radio mode is not shown in detection mode or Read mode, the network device 10 may be in sleep mode 100.

As described above, a Z-Wave Beam comprises a packet that is repeated a plurality of times. The packet includes a preamble, a sync character and data. Note that there are no Z-Wave Beams for a period of time. Thus, during this time, the network device 10 wakes periodically, cycles through all of the channels and returns to sleep mode. In other words, the network device 10 executes sleep mode 100, Z-Wave initialization state 110 and Z-Wave Beam detection mode 120 shown in FIG. 2. In FIG. 3, this sequence occurs twice. Note that, during the third time that the network device 10 wakes, a Z-Wave Beam is already being transmitted on channel 2. The network device 10 wakes and configures the DSA circuit 34 to monitor channel 1. Since the Z-Wave Beam is not on channel 1, the timer 50 expires and the network device 10 returns to Z-Wave initialization state 110, where the values for channel 2 are loaded into hardware registers 32 and 35. Sometime after loading these values, the processing unit 20 determines that a valid signal was found on channel 2. As stated above, this may be done by polling the hardware registers in the DSA circuit 34 either continuously or upon expiration of the timer 50, or by waiting for an interrupt to be generated. The network device 10 then transitions to Read mode 130. However, in this example, the packet being transmitted in the Z-Wave Beam had begun before the network device 10 selected channel 2. Therefore, the network device 10 is unable to successfully receive this particular instantiation of the packet in the Z-Wave Beam. Consequently, the network device 10 must wait until the packet in the Z-Wave Beam is repeated. However, it is possible that the Z-Wave Beam is not being transmitted or the network device 10 incorrectly identified the Z-Wave Beam. After the packet in the Z-Wave Beam is repeated and received by the network device 10, the network device enters sleep mode 100.

Figure 4:
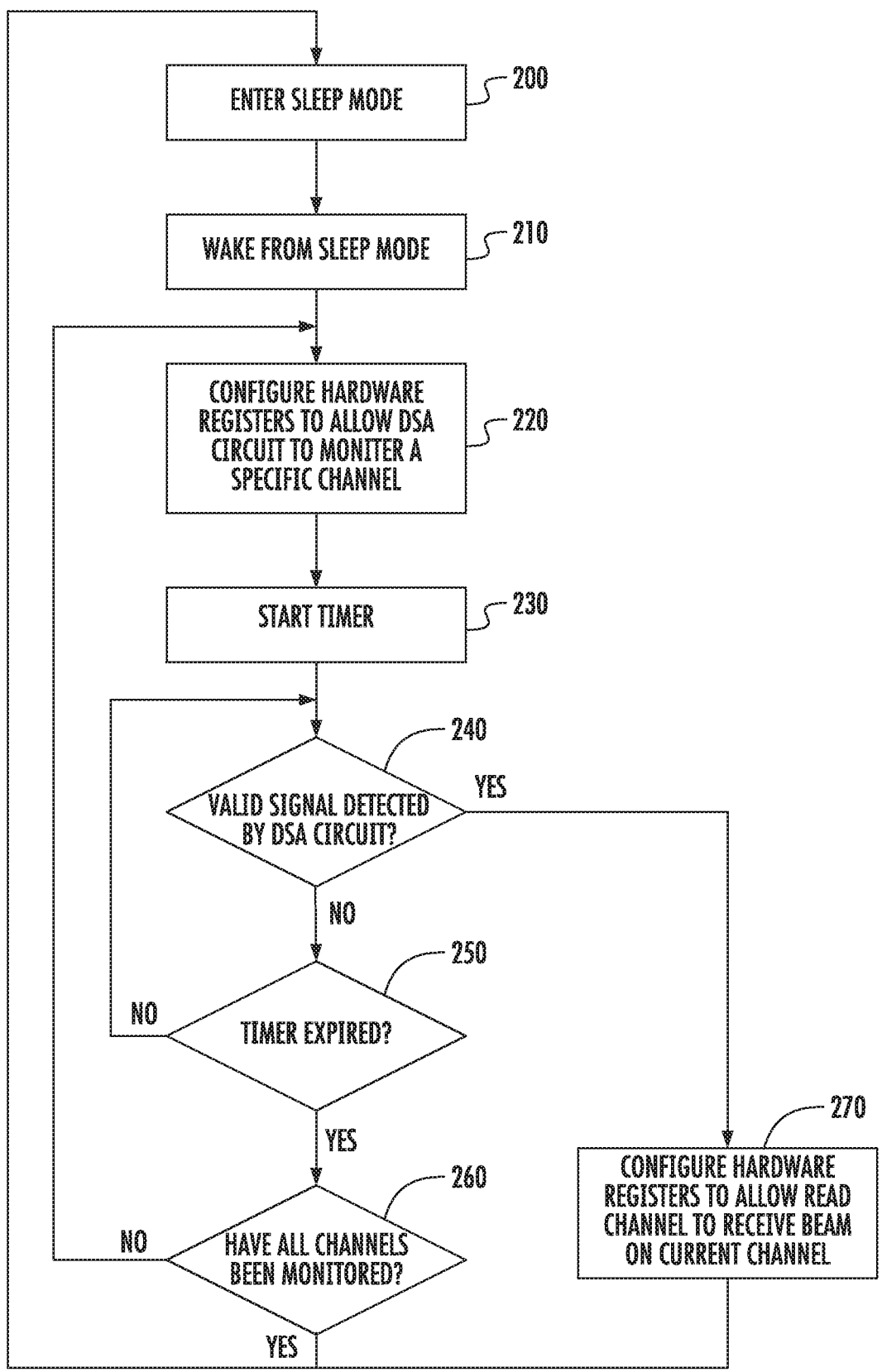
FIG. 4 is a representative flowchart showing the operation of the processing unit during the Z-Wave Beam detection period according to one embodiment.

A more detailed flow chart is shown in FIG. 4, which illustrates the sequence performed by the processing unit 20. The network device 10 begins in a sleep mode, as shown in Process 200. Periodically, the processing unit 20 is wakened, as shown in Process 210. For example, a wake-up timer may be included in the network device 10, which wakes the processing unit 20 roughly every 1 second, although the disclosure is not limited to this value and other durations are also possible. In certain embodiments, the wake-up timer is set to a value that is shorter than the minimum Z-Wave Beam duration to ensure that the Z-Wave Beam is detected by the network device 10.

Once awake, the processing unit 20 then programs the hardware registers 32 in the radio circuit 31 and/or the hardware registers 35 in the DSA circuit 34, as shown in Process 220. These register values allow the network interface 30 to monitor one of the channels of the wireless network 39. The processing unit 20 then starts a timer 50, as shown in Process 230. As stated above, the timer 50 is set to a value that is at least as long as the duration needed for the DSA circuit 34 to detect a valid signal on the selected channel. The processing unit 20 then waits for an indication that a valid signal has been detected on the selected channel, as shown in Process 240. As explained above, the processing unit 20 may continuously poll the hardware registers 35 in the DSA circuit 34 to determine whether the DSA circuit 34 has detected a valid signal on the selected channel. In another embodiment, the processing unit 20 may wait for an interrupt to be generated, which indicates that a valid signal has been detected. Alternatively, the processing unit 20 may simply wait until the timer 50 has expired before polling the hardware registers.

If a valid signal was detected, the processing unit 20 then programs the hardware registers 37 in the read channel 36 so that the read channel is able to receive the Z-Wave Beam in the selected channel, as shown in Process 270. In certain embodiments, the processing unit 20 may also program all of the hardware registers 37 in the read channel during Process 220. However, this increases the amount of time that Process 220 takes to execute, which increases the amount of time that the network device 10 must remain awake.

Figure 5:
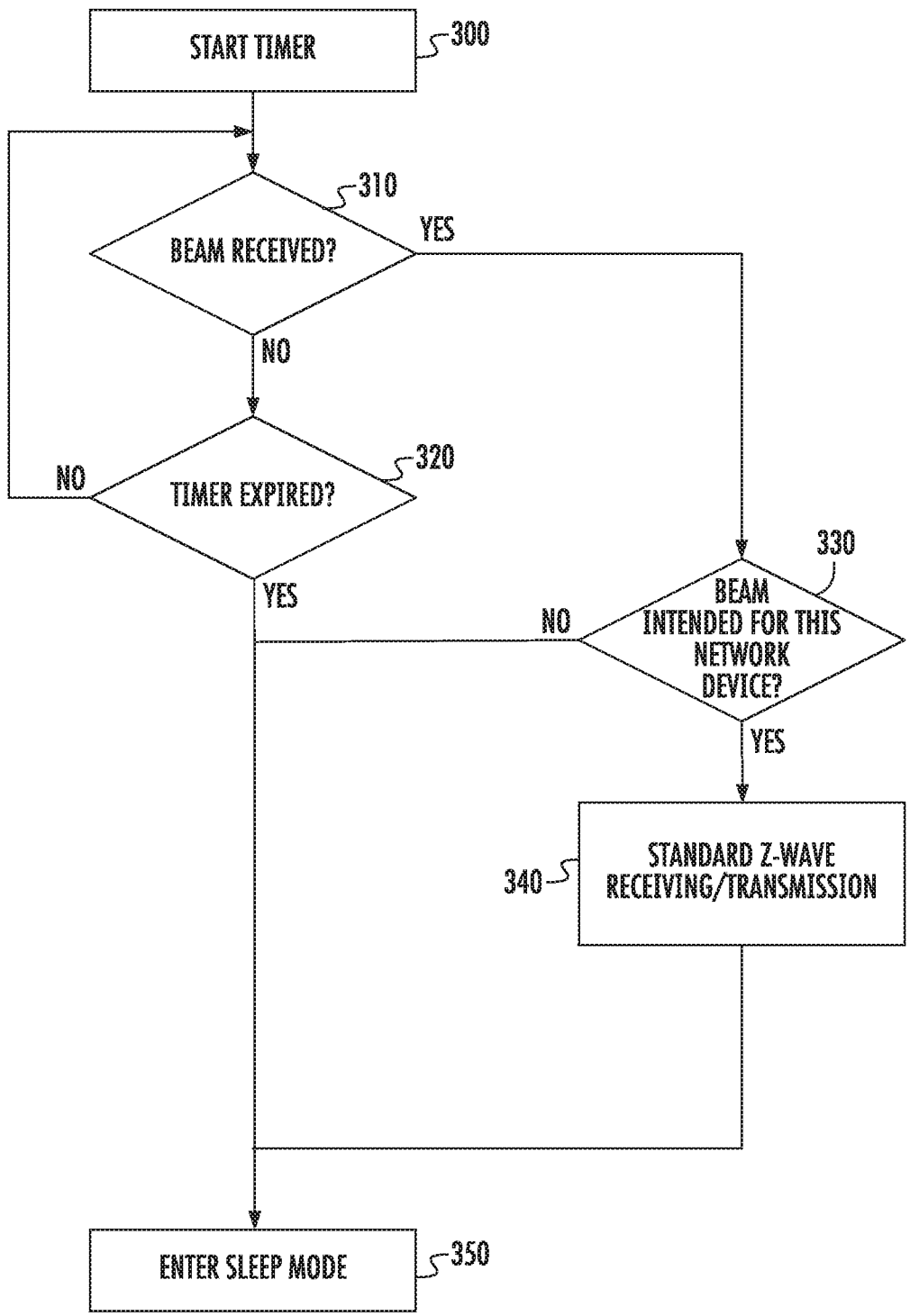
FIG. 5 is a representative flowchart showing the operation of the processing unit after a Z-Wave Beam has been detected according to one embodiment.

The network device 10 then attempts to receive the Z-Wave Beam and process that Z-Wave Beam appropriately, as explained below with respect to FIG. 5. After the Z-Wave Beam has been received and processed, the processing unit 20 then returns to sleep mode, as shown in Process 200.

If, however, after the timer 50 expires, as shown in Process 250, the DSA circuit 34 did not detect a valid signal on the selected channel, the processing unit 20 then checks to see if all of the channels have been monitored, as shown in Process 260. If all of the channels have not been monitored yet, the processing unit 20 returns to Process 220 where the values needed for a different channel are loaded into hardware registers 32 and 35.

If, on the other hand, the processing unit 20 determines that all of the channels have been monitored, the processing unit 20 returns to sleep mode as shown in Process 200.

In FIG. 4, Process 270 allowed the read channel 36 to receive the Z-Wave Beam. However, there are multiple steps involved in receiving a Z-Wave Beam. The sequence followed by the processing unit 20 after transitioning to Process 270 is shown in FIG. 5.

First, as shown in Process 300, the processing unit 20 may initiate another timer 50. This timer is used to set the maximum time that the network device 10 will remain awake to receive the Z-Wave Beam. After setting the timer 50, the processing unit 20 then checks to determine whether a Z-Wave Beam has been received, as shown in Process 310. If the Z-Wave has not been received yet, the network device 10 ensures that the timer 50 has not expired yet, as shown in Process 320. If the timer has expired without receiving the Z-Wave Beam, the network device 10 enters sleep mode, as shown in Process 350. If a Z-Wave Beam is received, the processing unit 20 then checks to see if the Z-Wave Beam was intended for this network device 10, as shown in Process 330. If it is not, the network device 10 enters sleep mode, as shown in Process 350. If, on the other hand, the Z-Wave Beam was intended for this network device 10, the processing unit 20 then proceeds to traditional Z-Wave receiving and transmission, as shown in Process 340. When that standard processing is complete, the network device enters sleep mode, as shown in Process 350.

While the above disclosure described the use of this network device 10 in the reception of Z-Wave beams, it is understood that the disclosure is not limited to this embodiment. For example, this technique may be used with any network protocol that utilizes channel hopping. For example, the process shown in FIG. 4 can be used to determine whether a packet is present on any of the available channels while minimizing the amount of time that the network device 10 must be awake.

The system and method described herein has many advantages. First, the present system achieves very low power consumption. A traditional FLiRS devices does not include a DSA circuit 34. Consequently, in order to determine whether a packet is being transmitted on the selected channel, the FLiRS device must monitor each channel for at least one Z-Wave Beam packet length in order to ensure that any preamble is necessarily seen by the read channel. For a standard beam frame using a 100 kbps PHY and three channels, this time may be about 440 microseconds. This time is then multiplied by the number of channels that are active. However, there is also time required to switch from one channel to another. This time may be about 100 microseconds. Thus, for a three channel Z-Wave FLiRS device, the awake time may be at least 1,620 microseconds. In contrast, the present system allows the network device 10 to determine within 330 microseconds whether a valid signal is present on the selected channel. Thus, in the case that no Z-Wave Beams are being transmitted, the network device of the present disclosure only needs to be awake for approximately 1,290 microseconds. This is a reduction in awake time of over 20%!

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A network device for receiving a Z-Wave Beam on a Z-Wave network that utilizes a plurality of channels, comprising:
   a network interface, comprising:
      a radio circuit to receive wireless signals on a selected channel and convert the wireless signals into digital signals, wherein the digital signals comprise I and Q signals;
      a CORDIC to generate phase information based on the I and Q signals;
      a digital signal arrival (DSA) circuit to receive the phase information and determine whether a valid signal is present on the selected channel;
      a read channel to receive the digital signals and decode the digital signals to form packets;
   a processing unit, in communication with the network interface; and
   a memory device, in communication with the processing unit, the memory device comprising instructions that, when executed by the processing unit, enable the network device to:
      load a set of values into hardware registers disposed in the radio circuit, wherein the set allows the radio circuit to monitor one channel of the network;
      monitor the channel for a valid signal using the DSA circuit, wherein the DSA circuit:
         calculates a frequency of each data point based on the phase of the I and Q signals;
         and detects a valid signal by:
            determining whether a difference in the phase between two adjacent data points is less than a predetermined threshold; and/or
            detecting a presence of an FSK signal by determining whether the frequency deviation lies between an upper limit and a lower limit;
      if the valid signal is detected within a predetermined period of time, process the Z-Wave Beam on the channel;
      if the valid signal is not detected within the predetermined period of time, load a different set of values into the hardware registers and repeat until all channels have been monitored; and
      if all channels have been monitored and the valid signal is not detected on any channel, enter a sleep mode.

2. The network device of claim 1, wherein the predetermined period of time is user selectable.

3. The network device of claim 2, wherein the predetermined period of time is greater than a minimum time needed by the DSA circuit to detect the valid signal.

4. The network device of claim 1, wherein the valid signal is detected by monitoring the digital signals for the presence of the FSK signal.

5. The network device of claim 1, wherein the valid signal is detected by monitoring the phase of the digital signals.

6. The network device of claim 1, wherein the CORDIC generates amplitude information from the I and Q signals, the DSA circuit receives the amplitude information and wherein the valid signal is detected by monitoring the Received Signal Strength Indicator (RSSI).

7. The network device of claim 1, wherein processing the Z-Wave Beam on the channel comprises:
   loading values into registers disposed in the read channel;
   determining whether the Z-Wave Beam was received within a second predetermined duration of time;
   if the Z-Wave Beam was not received, entering sleep mode; and
   if the Z-Wave Beam was received, determining if the Z-Wave Beam was intended for this device.

8. A method of detecting the presence of a Z-Wave Beam on a wireless Z Wave network utilizing multiple channels, the method comprising:
   loading a set of values into hardware registers disposed in a radio circuit of a network device, wherein the set allows the radio circuit to monitor one channel of the wireless network;
   monitoring the channel for a valid signal, wherein the monitoring comprises:
      converting wireless signals into digital signals, wherein the digital signals comprise I and Q signals;
      calculating a phase of the I and Q signals as a data point; and calculating a frequency of each data point based on the phase of the I and Q signals;

and wherein the valid signal is detected by:
determining whether a difference in the phase between two adjacent data points is less than a predetermined threshold; and/or
detecting a presence of a FSK signal by determining whether the frequency deviation lies between an upper limit and a lower limit;
if the valid signal is detected within a predetermined period of time, receiving the Z-Wave Beam on the channel;
if the valid signal is not detected within the predetermined period of time, loading a different set of values into the hardware registers and repeating until all channels have been monitored; and
if all channels have been monitored and the valid signal is not detected on any channel, entering a sleep mode.

9. The method of claim 8, wherein the valid signal is detected by monitoring the digital signals for the presence of the FSK signal.

10. The method of claim 8, wherein the valid signal is detected by monitoring the phase of the digital signals.

11. The method of claim 8, further comprising generating amplitude information using the I and Q signals and wherein the valid signal is detected by monitoring the Received Signal Strength Indicator (RSSI) of the digital signals.

12. The method of claim 8, wherein receiving the Z-Wave Beam on the channel comprises:
loading values into registers disposed in a read channel of the network device;
determining whether the Z-Wave Beam was received within a second predetermined duration of time;
if the Z-Wave Beam was not received, entering sleep mode; and
if the Z-Wave Beam was received, determining if the Z-Wave Beam was intended for the network device.

13. A software program, disposed on a computer readable non-transitory medium, for use with a network device operating on a wireless Z-Wave network, the network device comprising a processing unit, a radio circuit to receive wireless signals on a selected channel and convert the wireless signals into digital signals, wherein the digital signals comprise I and Q signals, a CORDIC to generate phase information from the I and Q signals, and a digital signal arrival (DSA) circuit to receive the phase information and determine whether a valid signal is present on the selected channel, the software program comprising instructions, which when executed by the processing unit, enable the processing unit to:
load a set of values into hardware registers disposed in the radio circuit, wherein the set allows the radio circuit to monitor one channel of the Z-Wave network;
monitor the channel for a valid signal using the DSA circuit, wherein the DSA circuit:
calculates a frequency of each data point based on the phase of the I and Q signals;
and detects a valid signal by:
determining whether a difference in the phase between two adjacent data points is less than a predetermined threshold; and/or
detecting a presence of an FSK signal by determining whether the frequency deviation lies between an upper limit and a lower limit;
if the valid signal is detected within a predetermined period of time, process the Z-Wave Beam on the channel;
if the valid signal is not detected within the predetermined period of time, load a different set of values into the hardware registers and repeat until all channels have been monitored; and
if all channels have been monitored and the valid signal is not detected on any channel, enter a sleep mode.

14. The software program of claim 13, wherein the valid signal is detected by monitoring the digital signals for the presence of the FSK signal.

15. The software program of claim 13, wherein the valid signal is detected by monitoring the phase of the digital signals.

16. The software program of claim 13, wherein the CORDIC generates amplitude information from the I and Q signals, the DSA circuit receives the amplitude information and wherein the valid signal is detected by monitoring the Received Signal Strength Indicator (RSSI).

17. The software program of claim 13, wherein processing the Z-Wave Beam on the channel comprises:
loading values into registers disposed in a read channel of the network device;
determining whether the Z-Wave Beam was received within a second predetermined duration of time;
if the Z-Wave Beam was not received, entering sleep mode; and
if the Z-Wave Beam was received, determining if the Z-Wave Beam was intended for the network device.

* * * * *